(12) United States Patent
Chung

(10) Patent No.: US 6,980,878 B2
(45) Date of Patent: Dec. 27, 2005

(54) MEMBRANE VALVE CONTROLLER OF A DUST-COLLECTING DEVICE

(75) Inventor: Hsi-Chun Chung, Lu Chou (TW)

(73) Assignee: Bag Filter Enterprise Co., Ltd., Taipei Hsien (TW)

(*) Notice: Subject to any disclaimer, the term of this patent is extended or adjusted under 35 U.S.C. 154(b) by 301 days.

(21) Appl. No.: 10/379,666

(22) Filed: Mar. 6, 2003

(65) Prior Publication Data

US 2004/0173100 A1 Sep. 9, 2004

(51) Int. Cl.[7] ............................................. G06F 19/00
(52) U.S. Cl. ..................... 700/160; 700/175; 15/301; 99/428
(58) Field of Search ................... 700/275, 159, 700/160; 73/864, 867.71; 62/317; 15/301, 15/314, 331, 339; 99/428; 55/283

(56) References Cited

U.S. PATENT DOCUMENTS

| 6,092,387 A * | 7/2000 | Hironaka et al. .............. 62/317 |
| 6,807,874 B2 * | 10/2004 | Totoki ...................... 73/864.71 |
| 2003/0136205 A1 * | 7/2003 | Totoki ...................... 73/864.71 |

* cited by examiner

Primary Examiner—Kidest Bahta
(74) Attorney, Agent, or Firm—Troxell Law Office, PLLC

(57) ABSTRACT

A kind of membrane valve controller of a dust-collecting device, mainly comprises a count conduction control template and a extending template so as to provide a applied structure which can realize modular extending unlimitedly, and accurate count control of the conduction time and the interval jump time of various sets of switches, and an enhancive differentia pressure and subsection design, which can alter the conduction time of control switch connected behind based on the measured value to, and continuing to execute repeating several spouting cleaning, which can facilitate the effect of cleanout.

3 Claims, 9 Drawing Sheets

MEMBRANE VALVE CONTROLLER OF A DUST-COLLECTING DEVICE

BACKGROUND—FIELD OF THE INVENTION

The invention relates to a structural improvement of the controller of a dust-collecting device, especially to the controller of membrane valve for a dust-collecting device which can realize modular extending unlimitedly, and accurately count control of the conduction time and interval jump time of various sets of switches, and an enhancive differentia pressure subsection design, which can alter the conduction time of control switch connected behind based on the measured value, and continuing to execute repeating several spouting cleaning, which can facilitate the effect of cleanout.

BACKGROUND—DESCRIPTION OF THE PRIOR ART

The typically dust-collecting device is provided with a couple of filtering bags arranging in an array. During the dust-cleaning manipulation, they are disposed row by row and staggeringly implemented, when one row of the filtering bags are cleaned, the other rows can maintain the usual action, ensuring the regular function of the entire dust-collecting device without swaying pausing.

For the sake of managing on the regular operation of the product line and maintaining the dust-collecting device so as to keep the regular filtering function within a period time, it is a very important work for the membrane valve to periodically provide the spouting air to implement the elimination of dust. Each the dust-collecting device is configured a control electro circuit board, on which the point to joint with the detector is arranged to connect the back inductor so as to facilitate the machine board to operate periodically and exert the elimination of dust of the connecting filtering bags. To realize the excellent effect of dust cleaning and economize the pressed air, it is necessary that the storing air pressure is quite high, and the adoptive membrane valve controlling the air conduction is able to be switched on or off in an instant.

With respect to the conventional membrane valve controller, each board control terminal is limited and can not be extended optionally, moreover, since the conduction time and the interval jump time is manually controlled with the knob, during the course of operation it is only through the flashing of the indicator light to decide which set of magnetic valves is operating, as result in a discrepancy among magnetic valves controlled by each board is generated, and further induce the output of wind is different, therefore it lead to fail to provide a consistent and steady movement, and a failed automatic adjustment according to the pressure. Besides, it cannot realize accurate control the air providing and consequently the energy is wasted.

Moreover, theoretically it is very convenient to take chance of the induct halt of the windmill to clean dust, which can achieve a preferable cleaning effect. However, since the measure of automatic repeated delay of blowing and filtering is not taken on the board body during the usual down time, once to take the chance to enhance the implementation of the cleaning of filtering bags, it may only resort to the manual operation or additional control by extra counter, as is very discommodious.

Therefore, to overcome the said disadvantages, the present inventor make a deep research and modification, and practiced many experiments, finally developed the invention.

The main object of the invention is to provide a kind of membrane valve controller of a dust-collecting device characterized by being able to modular extended unlimitedly, and realize an accurate count control of the conduction and interval jump time of various sets of switches.

The second object of the invention is to provide a kind of membrane valve controller of a dust-collecting device, which can continue to repeatedly execute several turns of cleaning and spouting according to the predetermined count value, so as to enhance the cleaning effect.

Another object of the invention is to provide a kind of membrane valve controller of a dust-collecting device with differentia pressure and subsection design, which can change the conduct time of the control switch connected behind.

SUMMARY OF THE INVENTION

To achieve the object described above, the invention provides a kind of membrane valve controller for a dust-collecting device comprising a count conduction control template and an extending template. Therefore it is provided an applied structure which realizes modularly extending unlimitedly and the accurate count control of the conduction time and interval jump time of various sets of switches, enhancive design of a differentia pressure subsection, which is used to alter the conduction time of the control switch connected behind according to the measured value, and is capable of continuing to repeatedly execute several turns of spouting and cleaning with respect to the predetermined count value during down time, so as to facilitate the dust-cleaning effect.

The structure and other characters of the invention will be clear after reading the following detailed description of the embodiments with reference to the drawings.

DETAILED DESCRIPTION OF THE PREFERRED EMBODIMENTS

Figure 1:
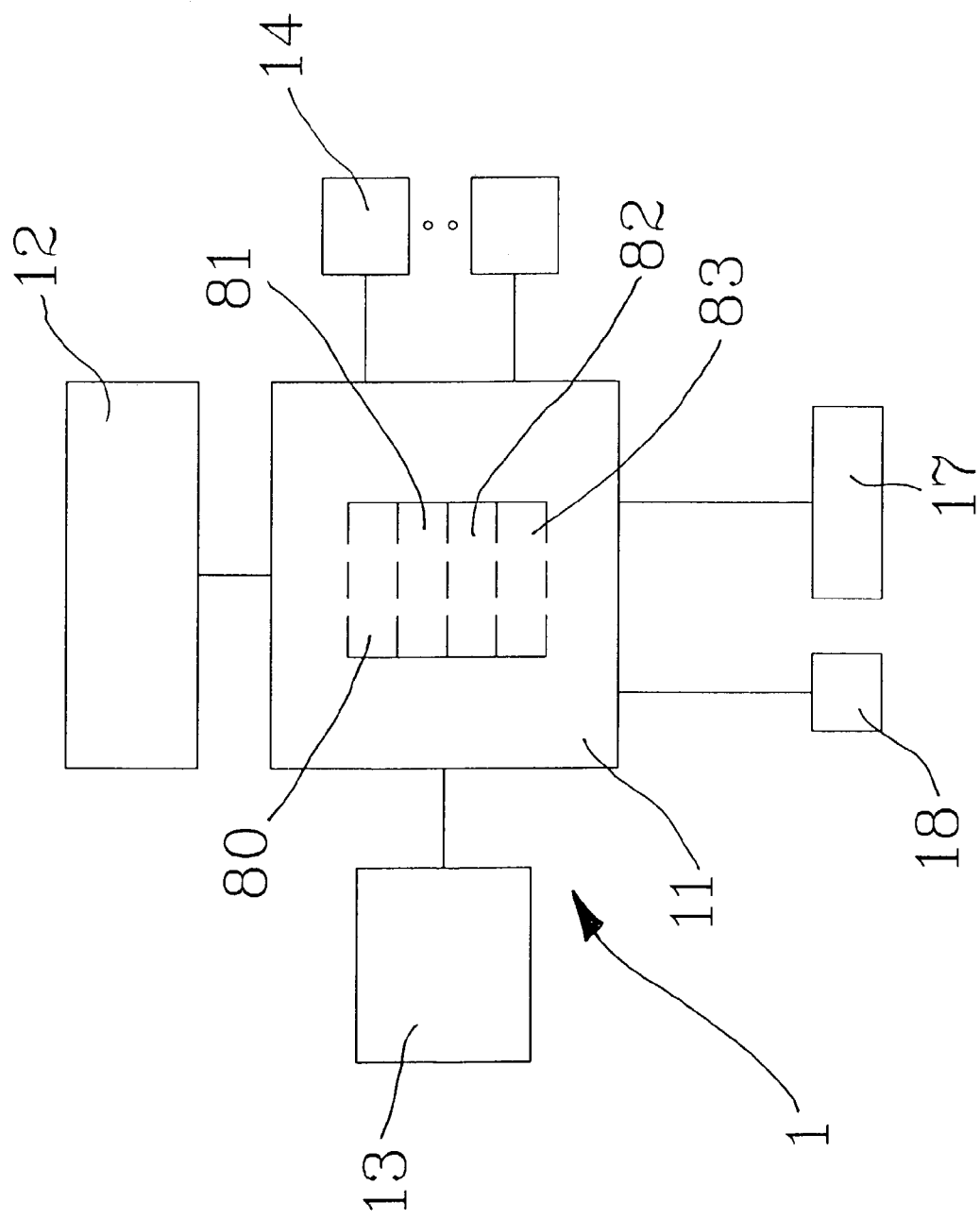
FIG. 1 shows the block diagram of the count conduction control template according to the present invention.
Figure 2:
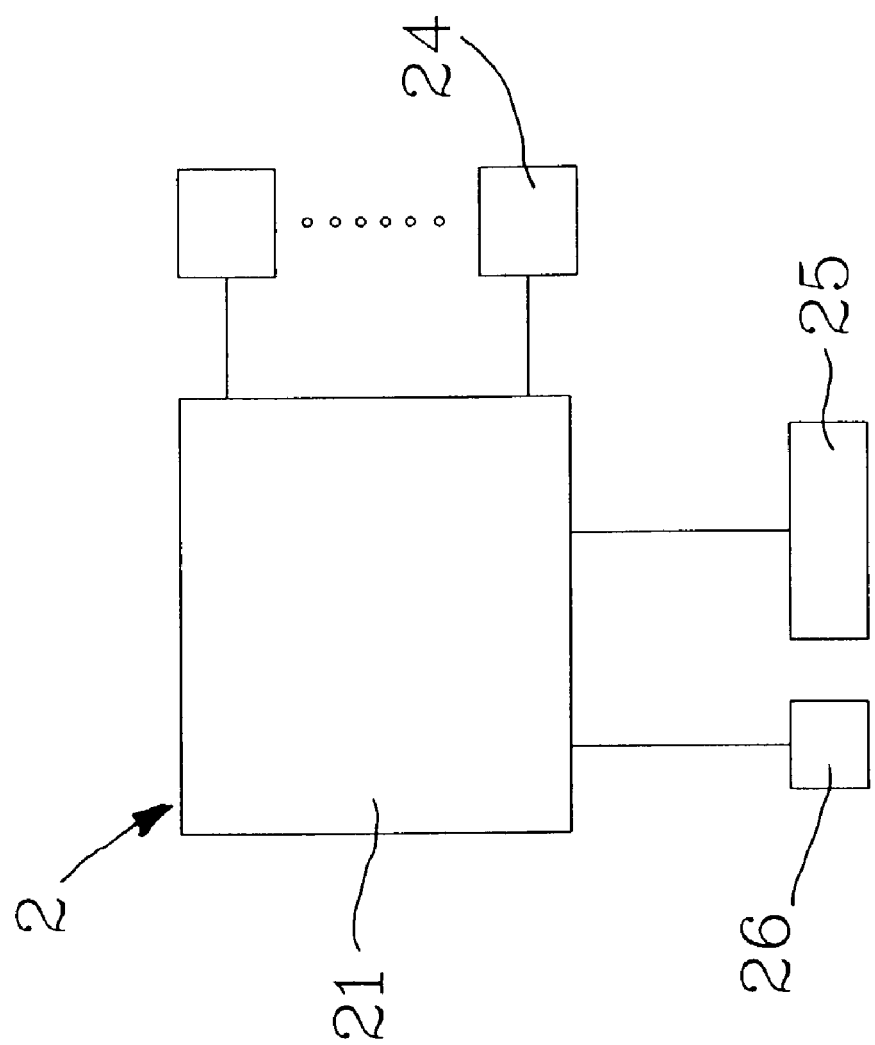
FIG. 2 shows the block diagram of the extending template according to the present invention.
Figure 3A:
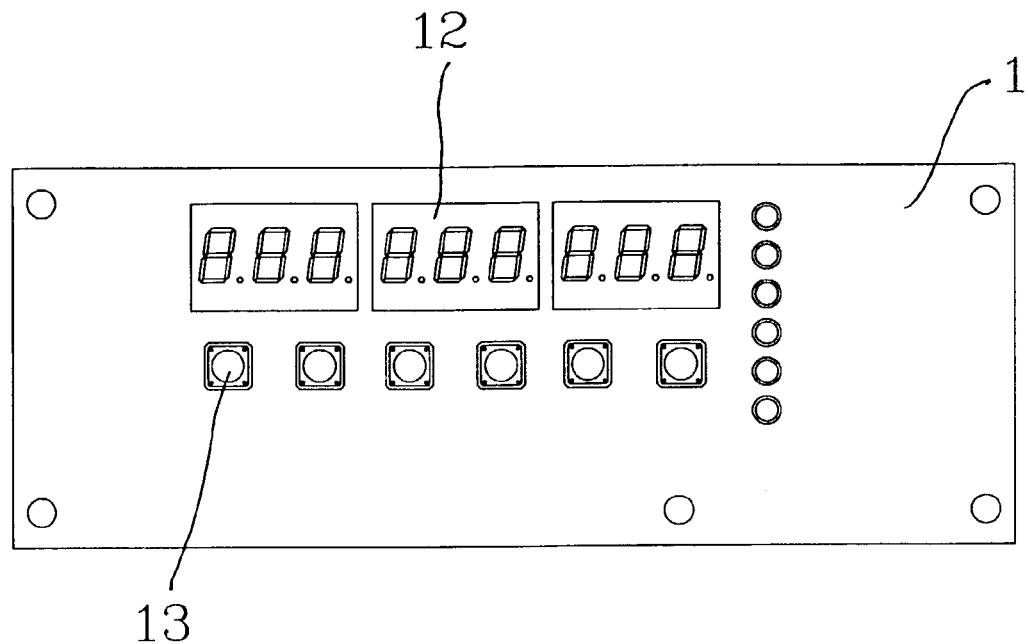
FIG. 3A shows the rear view of the circuit board of the control template according to the present invention.
Figure 3B:
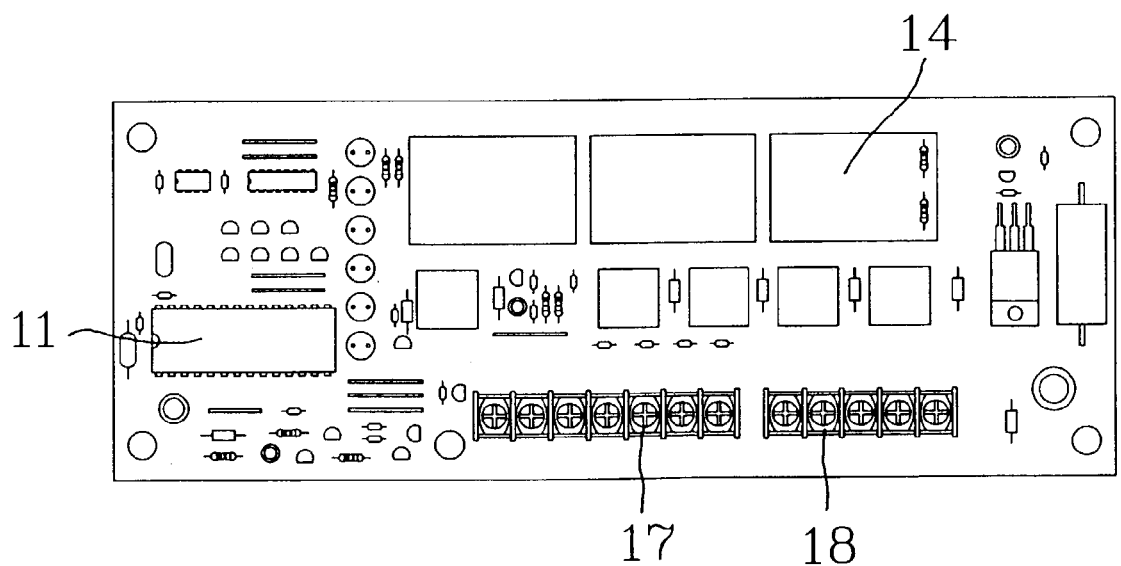
FIG. 3B shows the elevation of the circuit board of the control template according to the present invention.
Figure 4:
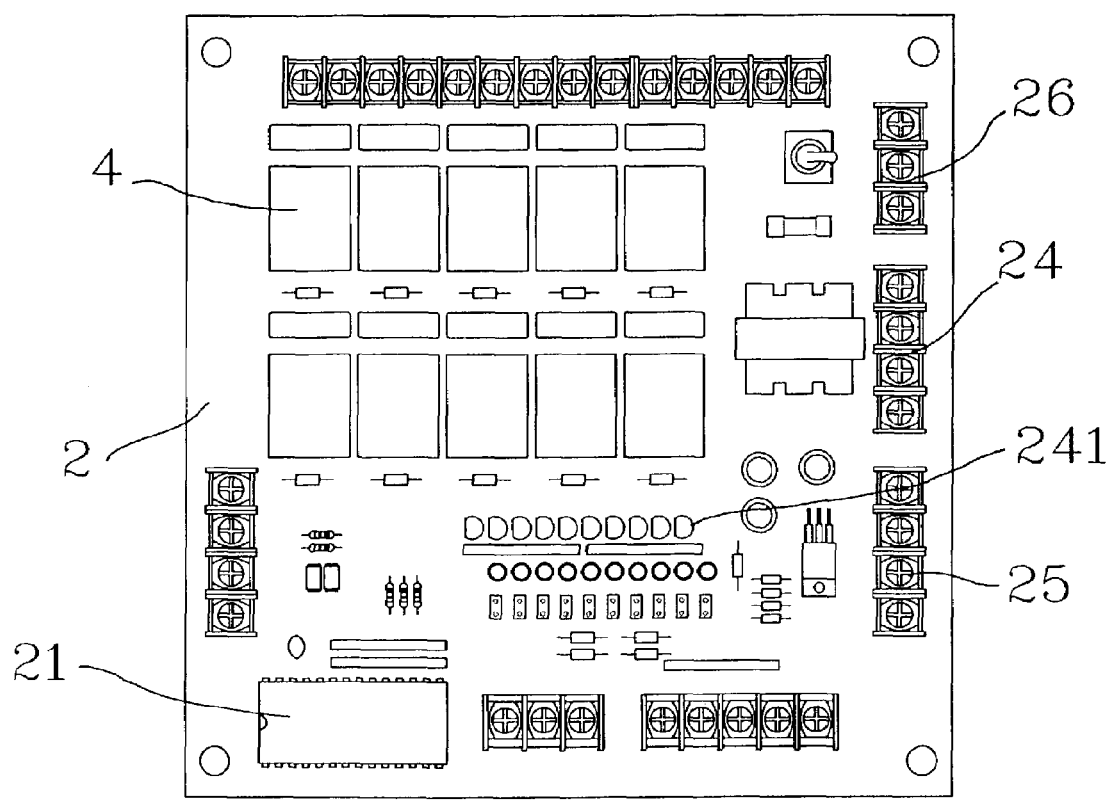
FIG. 4 shows the elevation of the extending template circuit board according to the invention.
Figure 5:
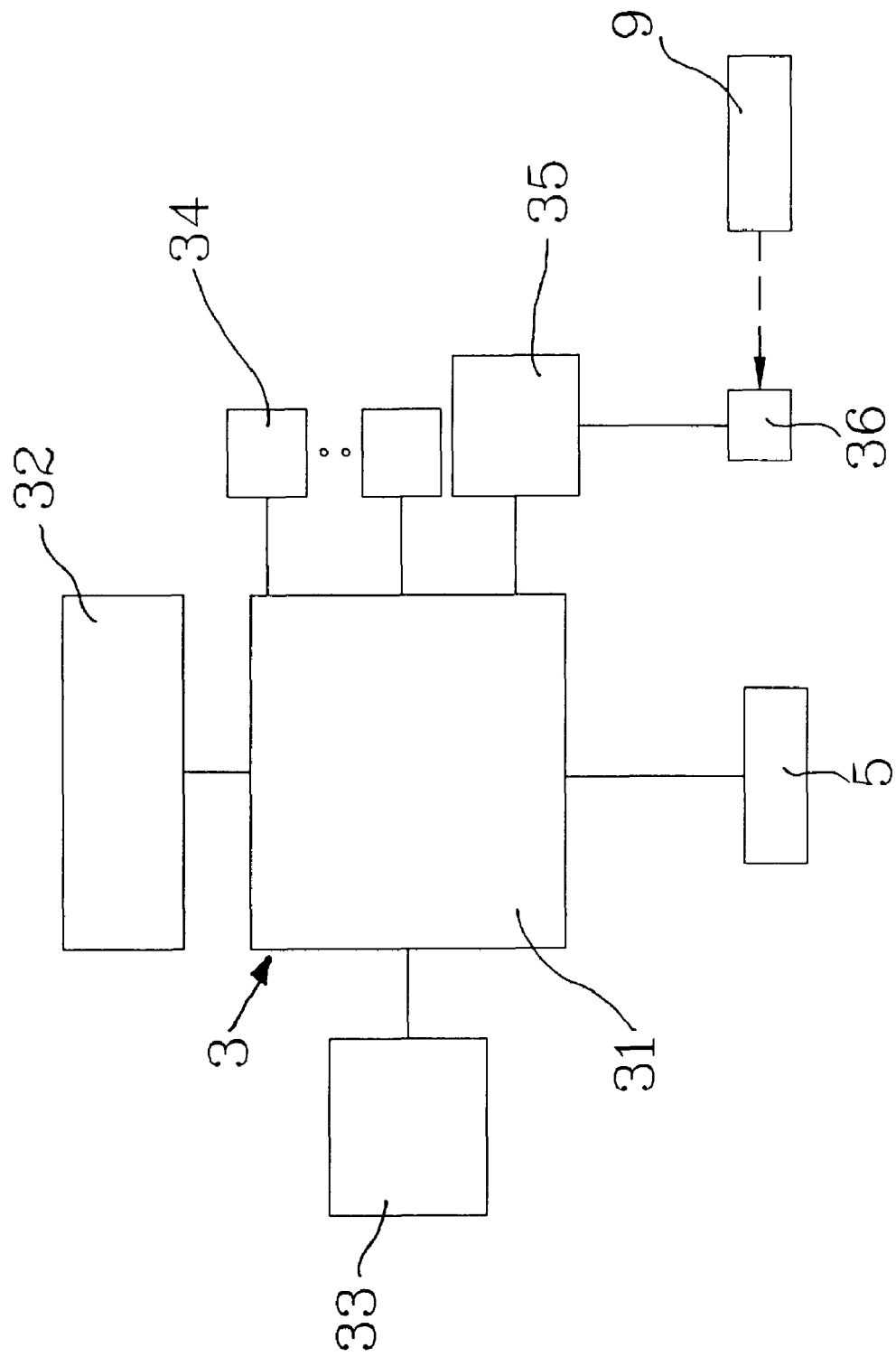
FIG. 5 shows the block diagram of the inductive template according to the invention.
Figure 6A:
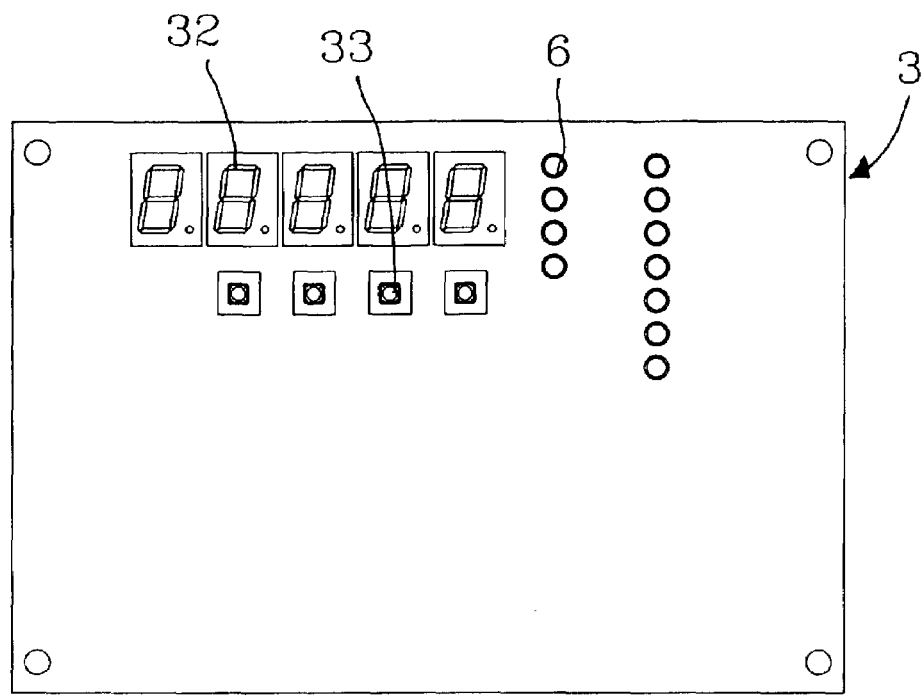
FIG. 6A shows the rear view of the circuit board of the inductive template according to the present invention.
Figure 6B:
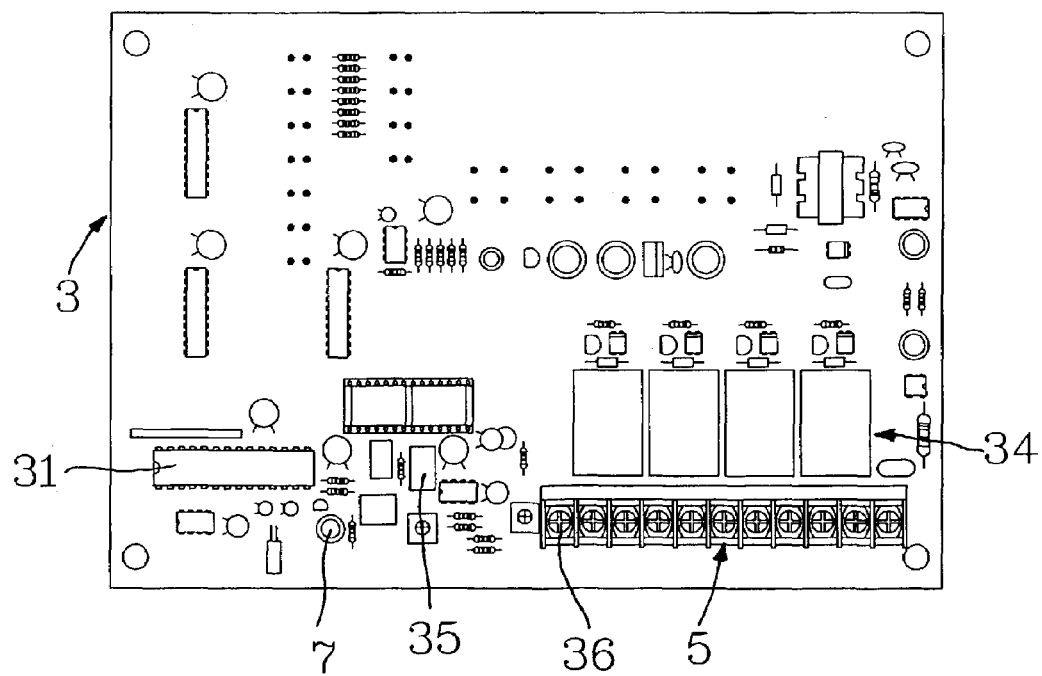
FIG. 6B shows the elevation of the circuit board of the inductive template according to the present invention.
Figure 7:
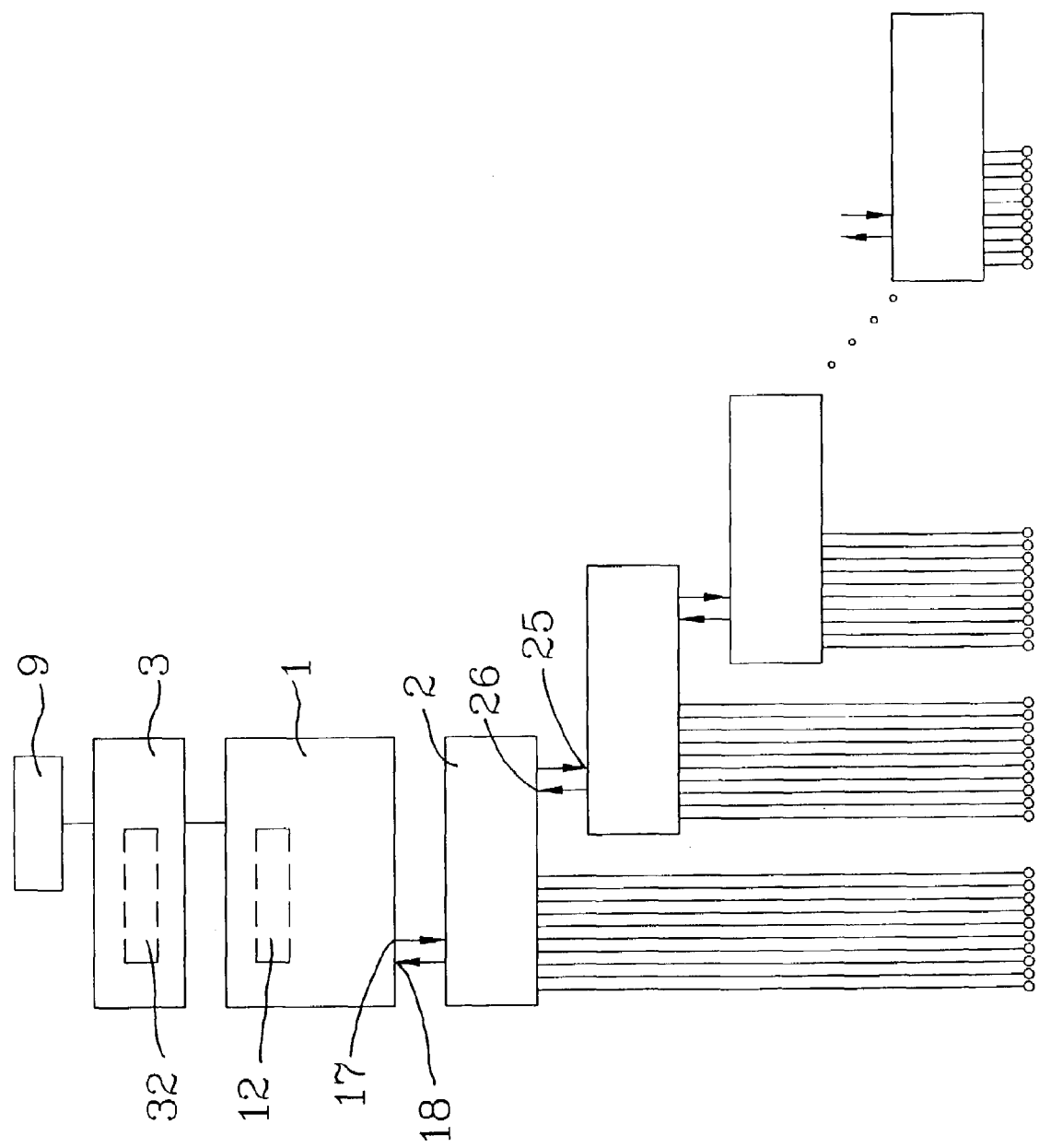
FIG. 7 shows the view of the embodiment with optional serially extending template according to the present invention.
Figure 8:
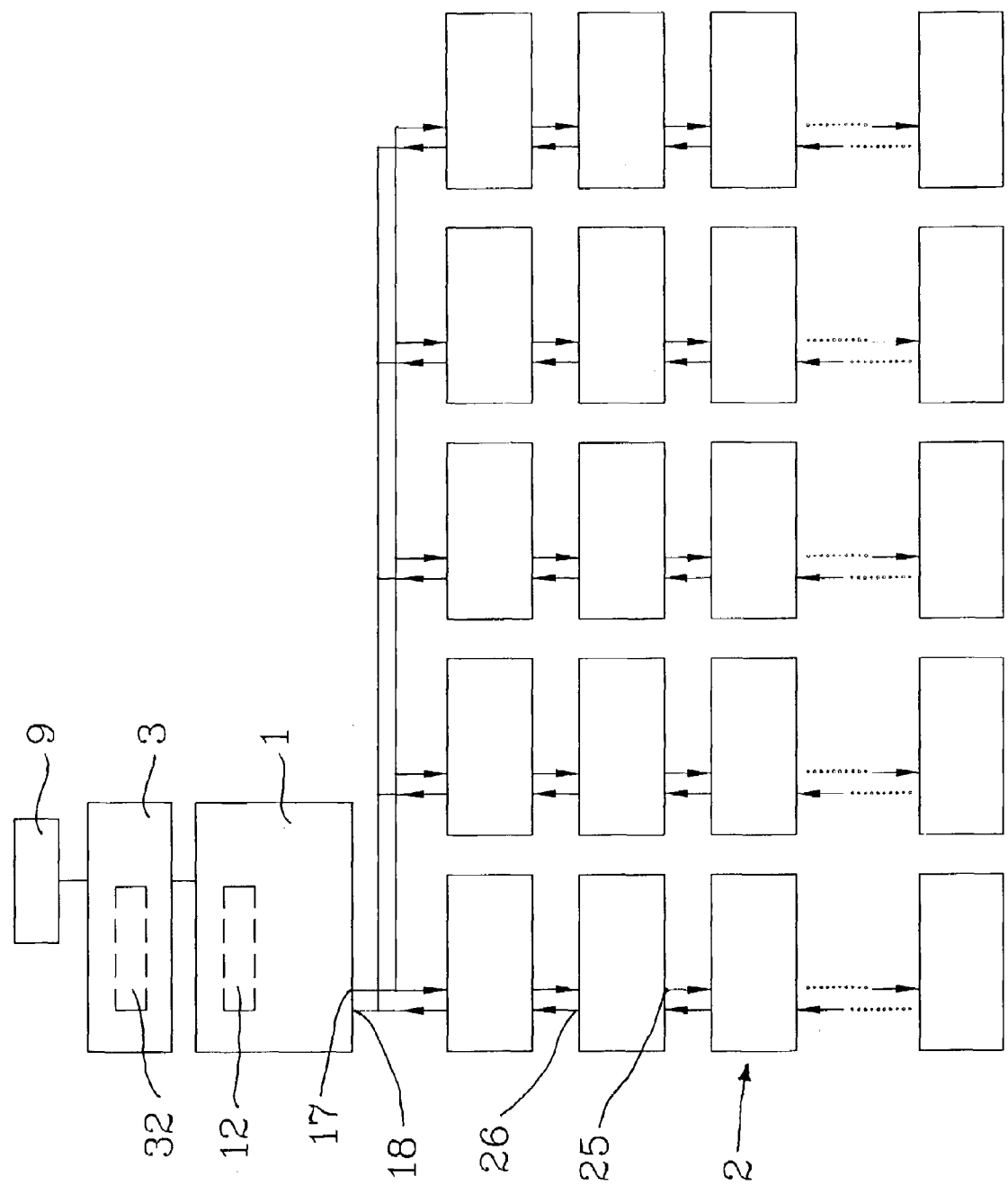
FIG. 8 shows the view of the embodiment according with the present invention connected parallelly with each rows after being extended serially.

As illustrated in FIG. 1 to FIG. 9, the present invention provides a kind of membrane valve controller of a dust-collecting device comprising a count conduction control template 1 and an extending template 2, in which on the control template 1, a CPU 11 is arranged to connect with the display panel 12, designated switch 13, a plurality of circuits 14 of relay switch, a control terminal set 17 connecting a extending template 2 in the rear, and a serial overflow receipt terminal 18 to receipt the count message from the serial extending template 2; and on the extending template 2, a CPU 21 is arranged to connect with a plurality of relay switch circuits 24, and a serially connected control port 25, which is configured a serial overflow receipt terminal 26 to receipt the count message from the serial extending template 2.

For further detailed description, a CPU21 is arranged on the extending template 2 to control the under connected a plurality of transistor 241 and control the relay 4, so as to execute conduction operation.

The interior of the count conduction control template 1 is arranged a repeated accumulative count unit 80 with automatic function of reset, which is mounted at inside of the CPU11 to count the number of the controlled conduction relay 4 connected with the rear of the template one by one, furthermore in which a control conduction time unit 81 is arranged in the interior of the CPU 11 controlling the conduction time of each switch circuit 14 ranging from 0.01 to 999.

A control interval time unit 82 is arranged in the interior of the CPU 11 to control the interval jump time of each switch circuit 14 ranging from 0.01 to 999.

A automatic repeated control unit 83, is arranged in the interior of CPU 11 to drive the machine to take a plural times of automatic repeated operation during down time, in which the repeated conducting times may be 1~9.

The said three units are respectively arranged a seven-section display of own counter to compose said display panel 12 and designated switch 13 knob.

Additionally, an inductive template 3 with a function of subsection detecting can be mounted in the front of the count conduction control template 1, on the top of which arranged a CPU 31 to connect with the display panel 32, the designated switch 33, and the plural relay switch circuit 34, an A/D conversion circuit 35. On the one end of the panel a detect receipt terminal 36 is arranged to receipt the electric message from the inductor 9. Once the message is converted by the A/D and is computed by the CPU 11 through checking up the table, then the control connect foot 5 according to various period of conduction time is generated. A plural indicator light 6 corresponds to different period of conduction time. According to the control connect foot 5, four control points is arranged in the interior of the CPU 11, in which the first point is the standard period of time, and the second period of conduction is ⅔ period of standard time, the third period conduction is ⅓ standard period of time, and the forth period is used to control the whistle of siren 7. Moreover, the said display panel 32 comprises a couple of seven-section LED displays, the count scale is from 0 to 999.

Figure 9:
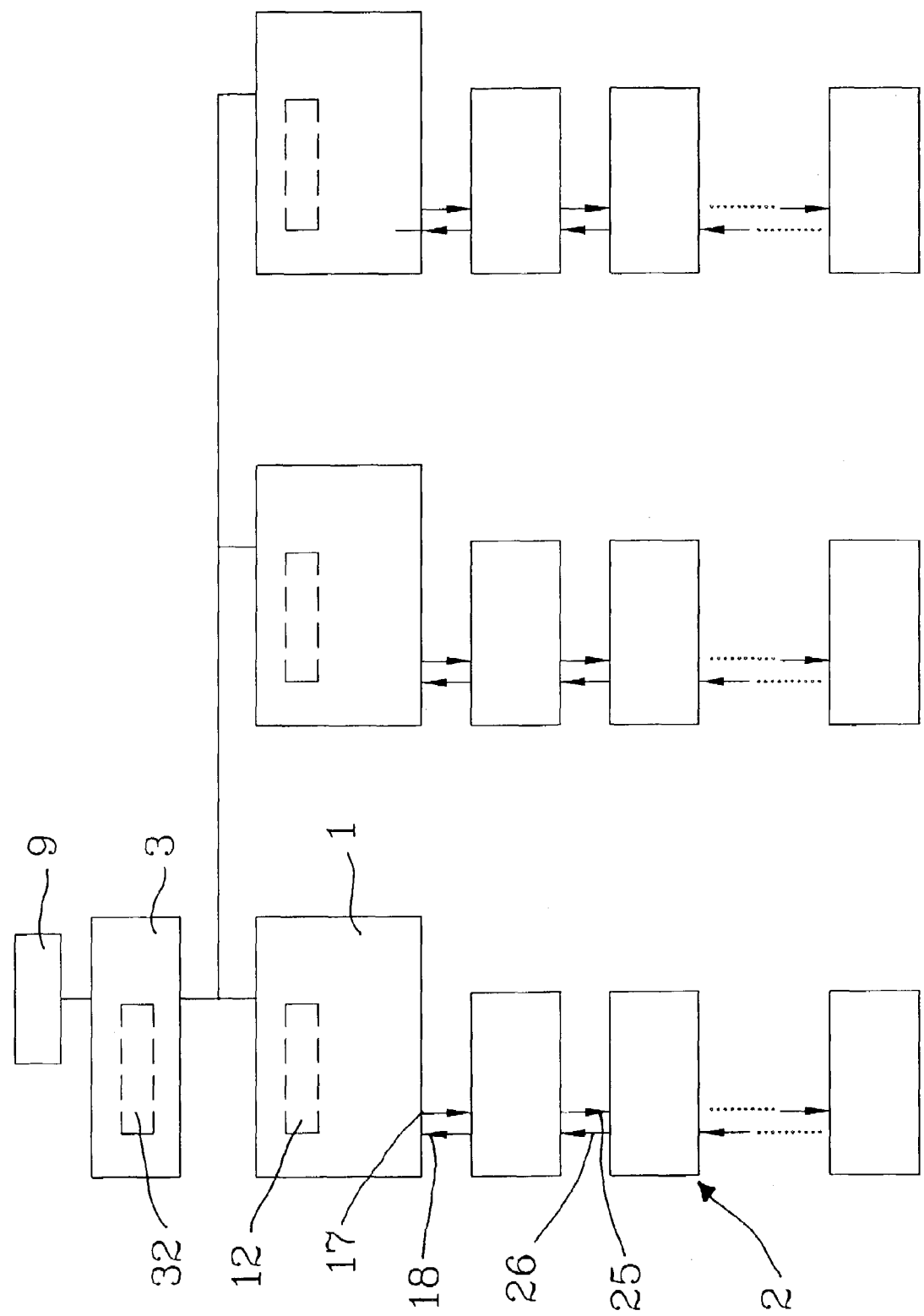
FIG. 9 shows the view of the embodiment according with the present invention under another connection method of parallel multi-rows.

Therefore, the count conduction control template 1 can be connected serially with extending template 2 to cooperate. Each extending template 2 can be connected in the rear with at least ten groups of membrane valves. Even the system serially connected with a number of extending templates 2 can be aligned transversely and communicated with each other to control simultaneously, as is further illustrated referring to FIG. 8 of drawings. Or by parallel extending of the conduction control template 1 as illustrated in FIG. 9, each branch circuit can set different jump and conduction time respectively. Hereby, the configuration of optional modular groups can extend unlimitedly, and can be employed to various dust-collecting device of different sales.

After being combined together entirely, the controller can realize the following function:

a The serial control port 25 of extending template 2 is configured a serial overflow receipt port 26, and the count conduction control template 1 is also arranged a serial overflow receipt port 18 to receipt the count message from the serially connected extending template 2, as enable the repeated accumulative count unit 80 with function of automatic reset arranged in the interior of the count conduction control template 1 to count and display by which set of relay 4 the present connecting extending template 2 is conducted.

b During conduction time, the count conduction control template 1, the display panel 12 and the designated switch 13 connected with CPU 11 can be used together to control the conduction time unit 81, further to control the conduction time of each switch circuit 14 and the design of the interval time unit 82, so as to control the switch interval time of each switch circuit 14.

c After being converted by A/D, the transferred value from inductor 9 is converted by CPU31 through checking up the table, then various differentia pressure conduction time slices are generated so as to realize automatic preferable adjust of the conduction of the membrane valve, meanwhile the display unit can be adjusted arbitrarily according to the scale of the inductor 9, for example The first section is relatively cleaned and the differentia pressure measured is little, the differentia pressure is about 100~200. Then the membrane valve controlled by the rear connected extending template 2 groups is set to spout and clean once each three minutes. If the differentia pressure is lower than 100, the cleaning is not implemented.

The filtering bags of the second section is more seriously accumulated than the fist section, the spouting and cleaning is required to be executed within little time, the differentia pressure is above 200 to 400, and one third of the predetermined value is detracted making the execution once two minutes.

The third section, when the differentia pressure is above 400~600, again one third of the predefined value is detracted to make the execution once one minutes.

With respect to the forth section, the differentia pressure surpasses 600 of the number section limit, Alme alarm is conducted or take another back section to process.

d Attributing to the automatic repeated control unit 83 configured in the entire combination, the machine body can implement automatically a plurality of repeated cleaning operations during down time, and the repeated conduction times can be optionally defined. Therefore, the controller may keep the membrane valve serially connected to repeat move several times before stop by the automatic repeating system, when the windmill is closed under no burden state, so as to achieve the better effect of filtering completely.

As described above, the invention may overcome the shortcomings of membrane valve controller of the conventional dust-collecting device, besides, its function ascend greatly the prior technology and is progressive and of industrial apply value, hence the invention apply is presented legally.

The preferable embodiment is used to illustrate the object, character and function in detail. It will be appreciated by persons skilled in the art that numerous variations and/or modifications may be made to the invention as shown in the specific embodiments without departing from the spirit or scope of the invention as broadly described.

I claim:

1. A membrane valve controller of a dust-collecting device comprising a count conduction control template and an extending template, the count conduction control template having a first CPU located thereon connected with a display panel, a designated switch, a plural relay switch circuit, and a control terminal group connected with the extending template, and a serial overflow receipt ports to receipt the count message from the serial extending template, and the extending template having a second CPU thereon connected with a plurality of circuits of a relay switch, and a serially connected control ports with serial overflow receipt terminals to receipt the count message from the serial extending template, wherein a modular method of combination is extendable unlimitedly and generally used by various dust-collecting device of different scales, and the membrane valve adjusts automatically and is conducted.

2. The membrane valve controller of a dust-collecting device according to claim 1, wherein:

the second CPU disposed on the extending template controls under connected plural transistors and the relay switch;

the count conduction control template includes a repeated accumulative count unit with automatic reset and which is disposed in an interior of the CPU to count the number of the controlled conduction relays connected with the rear of the template one by one;

a control conduction time unit provided in the interior of the CPU controls the conduction time of each switch circuit ranging from 0.01 to 999;

a control interval time unit provided in the interior of the CPU controls the interval jump time of each switch circuit ranging from 0.01 to 999; and an automatic repeated control unit provided in the interior of CPU drives the machine to take a plural times of automatic repeating operation during down time, the three units are respectively arranged a seven-section counter display on the display panel.

3. The membrane valve controller of a dust-collecting device according to claim 1, wherein:

an inductive template with subsection detecting is configured a count conduction control template in the front, and the first CPU is arranged thereon an A/D conversion circuit, a detecting receipt terminal is arranged on one end of the panel to receive an electric message from the inductor, once the message is converted by the A/D and is computed by the CPU through checking up the table, the control connect foot according to various period of conduction time is generated, a plural indicator light corresponds to different period of conduction time, furthermore four control points is arranged in the interior of the CPU, in which the first point is the standard period of time, and the second period of conduction is $\frac{2}{3}$ period of standard time, the third period conduction is the $\frac{1}{3}$ standard period of time, and the forth period is used to control the whistle of siren, moreover, the said display panel comprises a couple of seven-section LED displays, the count scale is from 0 to 999.

* * * * *